(12) United States Patent
Aihara

(10) Patent No.: US 6,243,137 B1
(45) Date of Patent: *Jun. 5, 2001

(54) VIDEO CAMERA POWER FAILURE DETECTION CIRCUIT

(75) Inventor: Kenichi Aihara, Tokyo (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/826,685

(22) Filed: Apr. 7, 1997

(30) Foreign Application Priority Data

Apr. 10, 1996 (JP) .................................... 8-088318

(51) Int. Cl.[7] .......................... H04N 5/225; G08B 21/00; G01R 31/36
(52) U.S. Cl. .......................... 348/372; 340/636; 324/771
(58) Field of Search ............................. 348/272; 396/129, 396/301; 340/663, 636, 693.1; 327/143; 320/152, 162; 364/925, 940, 965, 187; 714/14, 23, 22; 713/340; 361/92; 324/433, 771

(56) References Cited

U.S. PATENT DOCUMENTS

| 3,624,617 | * | 11/1971 | Putterman et al. .................. 711/152 |
| 4,502,774 | * | 3/1985 | Suzuki et al. ........................ 396/129 |
| 4,645,326 | * | 2/1987 | Kiuchi et al. ........................ 396/301 |
| 4,716,323 | * | 12/1987 | Wada et al. ............................ 327/50 |
| 5,212,797 | * | 5/1993 | Miyake et al. ........................ 714/14 |

OTHER PUBLICATIONS

Signetics CorpoOration, BDC–To–Decimal Decoder/Driver, pp. 2–48 to 2–49, 1972.*

* cited by examiner

Primary Examiner—Andrew B. Christensen
(74) Attorney, Agent, or Firm—Frommer Lawrence & Haug, LLP.; William S. Frommer; Glenn F. Savit

(57) ABSTRACT

A digital power fluctuation detecting apparatus detects fluctuations in a power supply signal and includes a data storage device, coupled to the power supply signal, that stores predetermined digital data signals but modifies at least one stored signal if the power supply signal fluctuates; a data monitoring device that monitors the stored signals; and a power fluctuation detector that determines if the stored signals differ from the predetermined digital data signals.

35 Claims, 6 Drawing Sheets

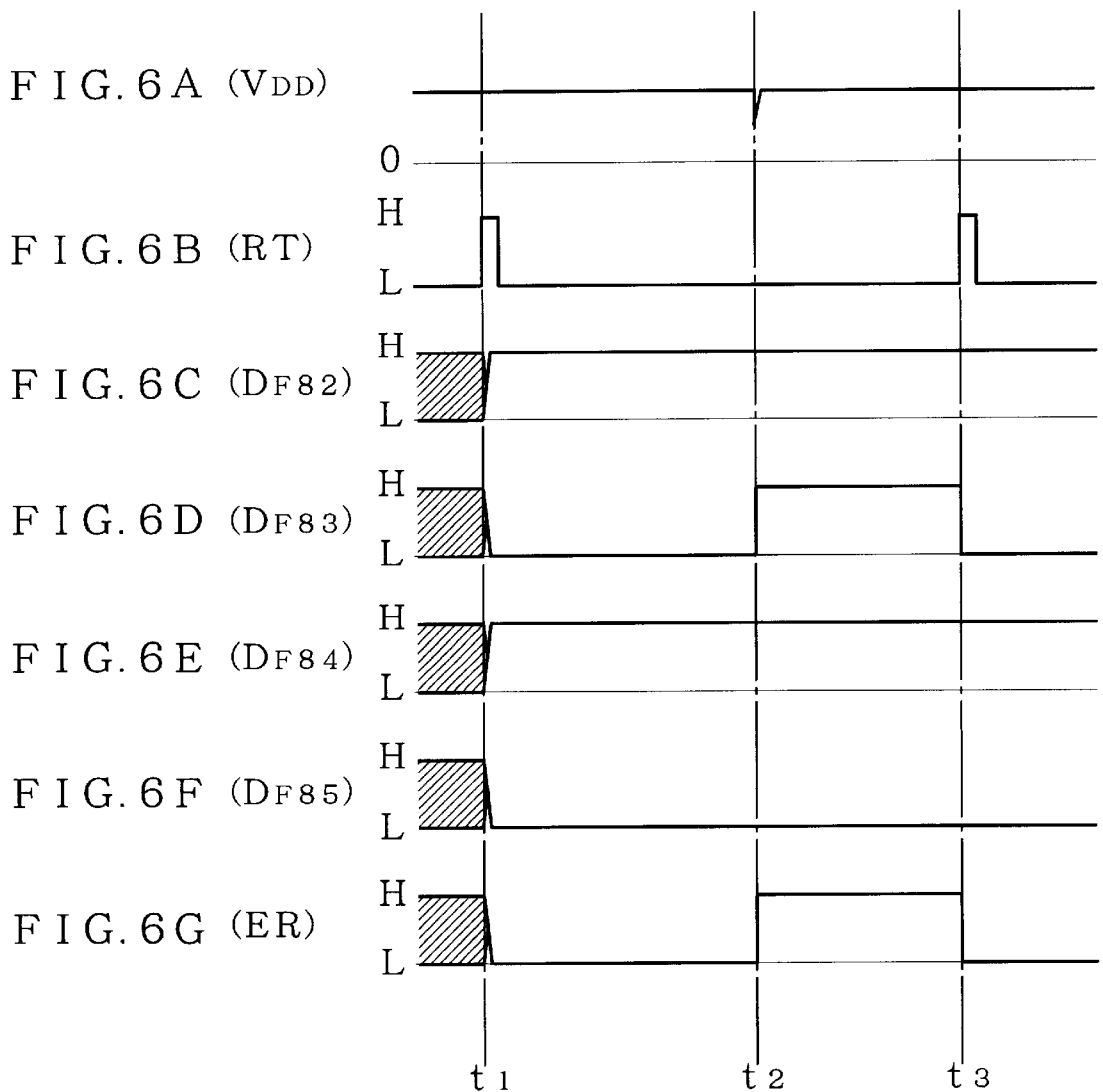

VIDEO CAMERA POWER FAILURE DETECTION CIRCUIT

BACKGROUND OF THE INVENTION

In a color video camera, the image of an object is detected by three imaging devices, such as CCD image sensors, each sensitive to a particular light component. Typically, an array of three CCD image sensors will produce analog image signals comprising red (R), green (G), and blue (B) signals. An analog-to-digital (A/D) converter converts each of the R, G, and B signals into corresponding digital signals. The digital R, G, and B signals are pre-processed by a pre-processing circuit to correct errors in the image signals such as pixel errors and shading irregularities.

Following pre-processing, the corrected signals are subject to further processing such as linear matrix processing, gamma correction, knee correction, and/or aperture compensation by a separate processing circuit. The processed signals are converted into brightness data and color-difference data. The digital brightness data and color-difference data are converted by a digital-to-analog (D/A) converter into corresponding analog signals. An encoder codes the analog brightness signal and analog color-difference signals to produce a composite image signal for display.

The digital brightness data and color-difference data may also be supplied to a data rate converter. The data rate converter modifies the clock rate of the received data to another clock rate. For example, the received data may be converted to data having a rate compatible with the recording operation of a video tape recording apparatus.

Each of the pre-processing circuit, the processing circuit, and the data rate converter operate in accordance with respective sets of predetermined parameter data. Typically, such parameter data is pre-stored into each of the pre-processing circuit, the processing circuit, and the data rate converter.

Upon a loss of power to the video camera or to one of its components, parameter data stored in a pre-processing circuit, a processing circuit, a data rate converter, or elsewhere, can be lost or damaged. Also, parameter data can be lost or damaged by power line noise or by electrostatic discharges. Loss of or damage to the stored parameter data usually results in erroneous operation of the video camera and in severe interruptions in signal processing operations.

To minimize improper camera operation, stored parameter data may be checked to detect loss or damage by reading out the stored parameter data. For example, the parameter data stored in each circuit utilizing such parameter data may be read to verify the parameter data. Such a verification process requires significant software overhead and is burdensome. The verification process is also inefficient since parameter data is infrequently lost or damaged.

OBJECTS AND SUMMARY OF THE INVENTION

Therefore, an object of the present invention is to provide apparatus and methodology for detecting a loss of power in a video camera.

Another object of the present invention is to provide apparatus and methodology for detecting loss of or damage to stored parameter data.

Still another object of the present invention is to provide a self-diagnostic apparatus and method for detecting loss of or damage to parameter data stored by a video camera.

According to an aspect of the present invention, an a digital power fluctuation detecting device for detecting fluctuations in a power supply signal is provided. The device includes a data storage device, coupled to the power supply signal, for storing a plurality of predetermined digital data signals as a plurality of stored signals and for modifying at least one of the plurality of stored signals if the power supply signal fluctuates; a data monitoring device, coupled to the data storage device, for monitoring the plurality of stored signals; and a power fluctuation detecting device for determining if the plurality of stored signals differs from the plurality of predetermined digital data signals.

According to another aspect of the present invention, a parameter loss detection apparatus for detecting contamination of a plurality of parameter data by a fluctuation in a power supply signal is provided. The apparatus includes a data storage device, coupled to the power supply signal, for storing a plurality of predetermined digital data signals as a plurality of stored signals and for modifying at least one of the plurality of stored signals if the power supply signal fluctuates; a parameter data storage device, coupled to the power supply signal, for storing a plurality of parameter data supplied by a controller; a data monitoring device, coupled to the data storage device, for monitoring the plurality of stored signals; and a power fluctuation detecting device for determining if the plurality of stored signals differs from the plurality of predetermined digital data signals and for generating a parameter data loss signal if the plurality of stored signals differs from the plurality of predetermined digital data signals.

According to a further aspect of the present invention, a parameter loss detection device for detecting contamination of a plurality of parameter data by a fluctuation in a power supply signal is provided. The device includes a data storage device, coupled to the power supply signal, for storing a plurality of predetermined digital data signals as a plurality of stored signals and for modifying at least one of the plurality of stored signals if the power supply signal fluctuates; and a parameter data storage device, coupled to the power supply signal, for storing a plurality of parameter data.

Other objects, features, and advantages according to the present invention will become apparent from the following detailed description of illustrated embodiments when read in conjunction with the accompanying drawings in which the same components are identified by the same reference numerals.

BRIEF DESCRIPTION OF THE DRAWINGS

FIGS. 6A, 6B, 6C, 6D, 6E, 6F, and 6G are signal diagrams to which reference will be made in describing the operation of the apparatus of FIG. 1.

DETAILED DESCRIPTION OF THE PREFERRED EMBODIMENTS

Figure 1:
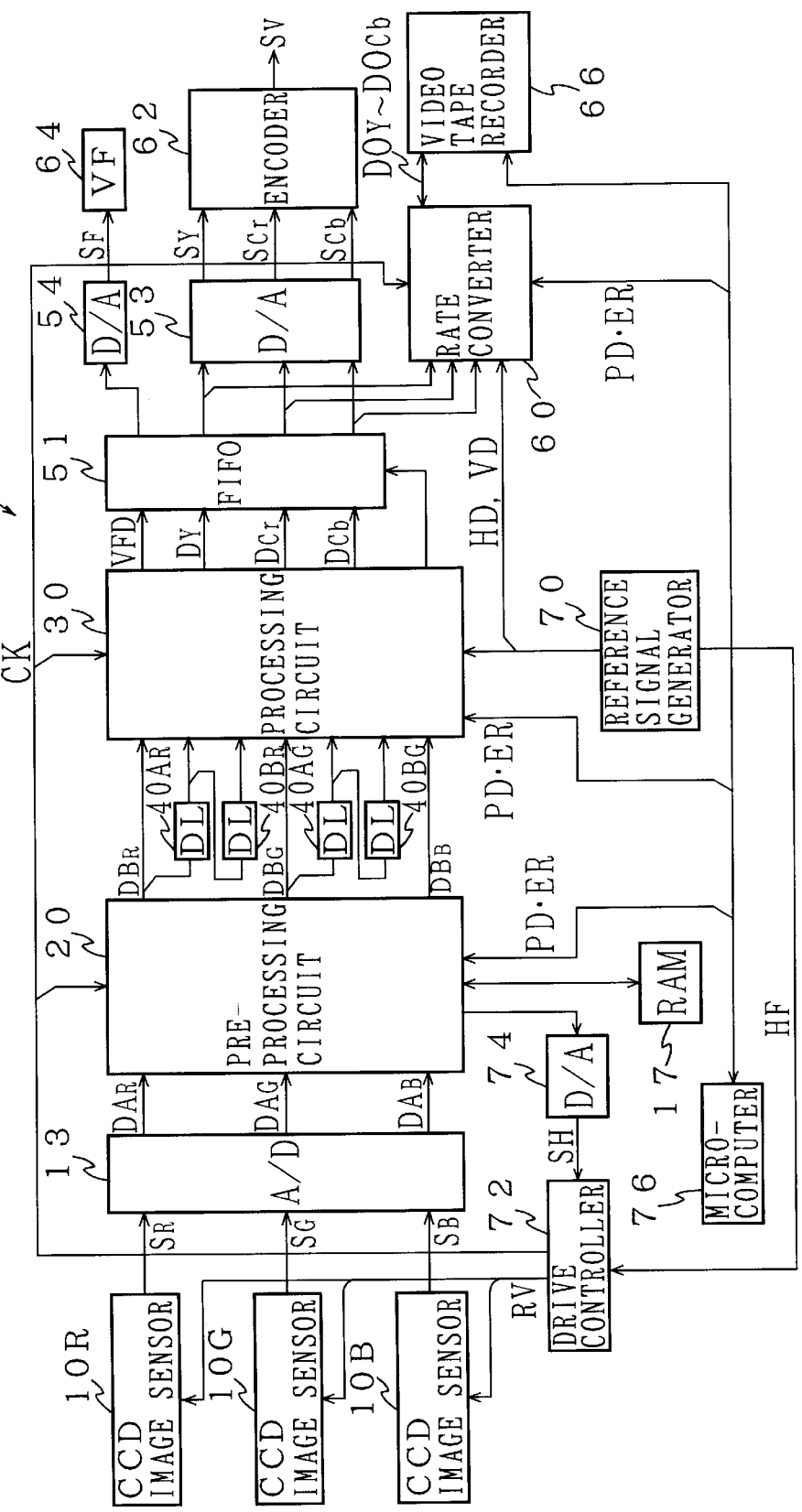
FIG. 1 is a block diagram of an imaging device according to an embodiment of the present invention.

FIG. 1 illustrates an imaging device 100 according to an embodiment of the present invention. Imaging device 100 includes charge-coupled devices (CCD) 10R, 10G, and 10B; an analog-to-digital (A/D) converter 13; a memory 17; a pre-processing circuit 20; delay circuits 40AR, 40BR, 40AG, and 40BG; a processing circuit 30; FIFO 51; digital-to-analog converters 53, 54, and 74; a rate converter 60; an encoder 62; a view finder 64; a video tape recorder 66; a reference signal generator 70; a drive controller 72; and a microcontroller 76.

CCD 10R, CCD 10G, and CCD 10B are conventional primary color image pick-up devices for imaging incident red, green, and blue light, respectively. Of course, CCD 10R, CCD 10G, and CCD 10B may alternatively comprise another type of conventional color image sensor. CCD 10R produces a red signal SR, CCD 10G produces a green signal SG, and CCD 10B produces a blue signal SB which are transmitted to A/D converter 13, a conventional analog-to-digital converter. A/D converter 13 converts signals SR, SG, and SB into digital form to produce a digital red signal DAR, a digital green signal DAG, and a digital blue signal DAB, respectively. The digital color signals are supplied to pre-processing circuit 20.

Pre-processing circuit 20, a conventional pre-processing device, corrects pixel errors, shading irregularities, and the like found in digital signals DAR, DAG, and DAB to produce corrected digital signals DBR, DBG, and DBB, respectively. To perform correction processing, pre-processing circuit 20 utilizes data stored in memory 17, a conventional memory device, such as a semiconductor random-access memory. In addition, pre-processing circuit 20 generates shading correction data SH which is supplied to D/A converter 74. The operations of pre-processing circuit 20 are synchronized with clock signal CK.

The corrected digital signals are supplied directly to processing circuit 30. In addition, corrected digital signal DBR is supplied to delay circuit 40AR and corrected digital signal DBG is supplied to delay circuit 40AG. Delay circuits 40AR, 40BR, 40AG, and 40BG are conventional delay elements for delaying an input signal by one horizontal scanning period.

Delay circuit 40AR delays digital signal DBR by one horizontal scanning period to produce delayed signal DBAR. Delayed signal DBAR is supplied to processing circuit 30 and to delay circuit 40BR. Delay circuit 40BR delays digital signal DBAR by one more horizontal scanning period to produce twice delayed signal DBBR. Signal DBBR is also supplied to processing circuit 30.

In a corresponding manner, delay circuit 40AG delays digital signal DBG by one horizontal scanning period to produce delayed signal DBAG. Delayed signal DBAG is supplied to processing circuit 30 and to delay circuit 40BG. Delay circuit 40BG delays digital signal DBAG by one more horizontal scanning period to produce twice delayed signal DBBG. Signal DBBG is also supplied to processing circuit 30.

Reference signal generator 70 generates a horizontal synchronization signal HD and a vertical synchronization signal VD which are supplied to processing circuit 30 and rate converter 60. In addition, reference signal generator 70 generates a reference signal HF which is supplied to drive controller 72.

Utilizing each of signals DBR, DBAR, DBBR, DBG, DBAG, DBBG, and DBB, along with synchronization signals supplied from reference signal generator 70, processing circuit 30 processes signals DBR, DBG, and DBB. Such processing may include linear matrix processing, gamma correction, knee correction, aperture compensation, and the like. Synchronization with pre-processing circuit 20 is maintained through reference to clock signal CK. Processing circuit 30 also executes YC matrix processing to generate brightness data DY and color difference data DCr and DCb. Further, processing circuit 30 produces viewfinder data VFD. Data DY, DCr, DCb, and VFD are supplied to FIFO 51, a temporary storage device.

FIFO 51 buffers the flow of data DY, DCr, DCb, and VFD. For example, input data DY, DCr, and DCb having an image aspect ratio of 16:9 may be buffered such that data DY, DCr, and DCb having an image aspect ratio of 4:3 is output. In other words, data having an image aspect ratio of 4:3 may be extracted from input data having an image aspect ratio of 16:9. Viewfinder data VFD is likewise subjected to buffering by FIFO 51. Buffered DY, DCr, and DCb data is supplied to D/A converter 53, a conventional digital-to-analog converter, and to rate converter 60. Buffered viewfinder data is supplied to D/A converter 54, also a conventional digital-to-analog converter.

D/A converter 53 converts the buffered brightness data DY and buffered color difference data DCr and DCb into analog brightness signal SY and analog color difference signals SCr and SCb, respectively. Signals SY, SCr, and SCb are supplied to encoder 62. Encoder 62, a conventional encoding device, codes signals SY, SCr, and SCb to produce composite signal SV for output. D/A converter 54 converts buffered viewfinder data into an analog viewfinder signal SF. Viewfinder signal SF is supplied to viewfinder 64, a conventional viewfinder device, for display to a user. Optionally, viewfinder 64 may be omitted.

D/A converter 74, a conventional digital-to-analog converter circuit, converts digital shading correction data SH into an analog shading correction signal SH which is supplied to drive controller 72. As a function of reference signal HF and analog shading correction signal SH, drive controller 72 generates a drive signal RV for controlling CCDs 10R, 10G, and 10B. Preferably, drive controller 72 controls CCDs 10R, 10G, and 10B to produce color signals SR, SG, and SB which have a minimum of shading. Also, drive controller 72 generates a clock signal CK synchronized with reference signal HF. Clock signal CK is supplied to pre-processing circuit 20, to processing circuit 30, and to rate converter 60.

Utilizing horizontal synchronization signal HD and vertical synchronization signal VD, rate converter 60 converts buffered DY, DCr, and DCb data into respectively corresponding data DOY, DOCr and DOCb, having a different clock rate. Synchronization with processing circuit 30 is maintained through reference to clock signal CK. For example, rate converter 60 may convert buffered DY, DCr, and DCb data into corresponding data having a clock rate compatible with video tape recorder 66, a conventional video tape recorder. Video tape recorder 66 is shown coupled to rate converter 60 and microcontroller 76 but, optionally, may be omitted. Rate converted data DOY, DOCr, and DOCb may be recorded by video tape recorder 66.

Each of pre-processing circuit 20, processing circuit 30, and rate converter 60 are coupled to microcontroller 76. Microcontroller 76 is a controller device, preferably a microprocessor or microcomputer. Microcontroller 76 controls the operation of each of pre-processing circuit 20, processing circuit 30, and rate converter 60 and provides parameter data PD to each. Parameter data may include a variety of data utilized by components of imaging device 100. For example, parameter data may comprise gamma correction data, knee correction data, signal clipping data, signal masking data, delay timing data, image signal correction data, and the like.

Further, each of pre-processing circuit 20, processing circuit 30, and rate converter 60 incorporates a parameter loss detection circuit 80 (shown in FIG. 2), the details of which will be described hereinbelow. Each of the parameter loss detection circuits outputs a loss flag signal ER to microcontroller 76. Loss flag signal ER serves as a self-diagnostic indication.

Upon reception of loss flag signal ER, microcontroller 76 determines that parameter data PD may have been lost by one or more of pre-processing circuit 20, processing circuit 30, and rate converter 60. Preferably, microcontroller 76 determines exactly which among pre-processing circuit 20, processing circuit 30, and rate converter 60 has lost parameter data PD.

Figure 2:
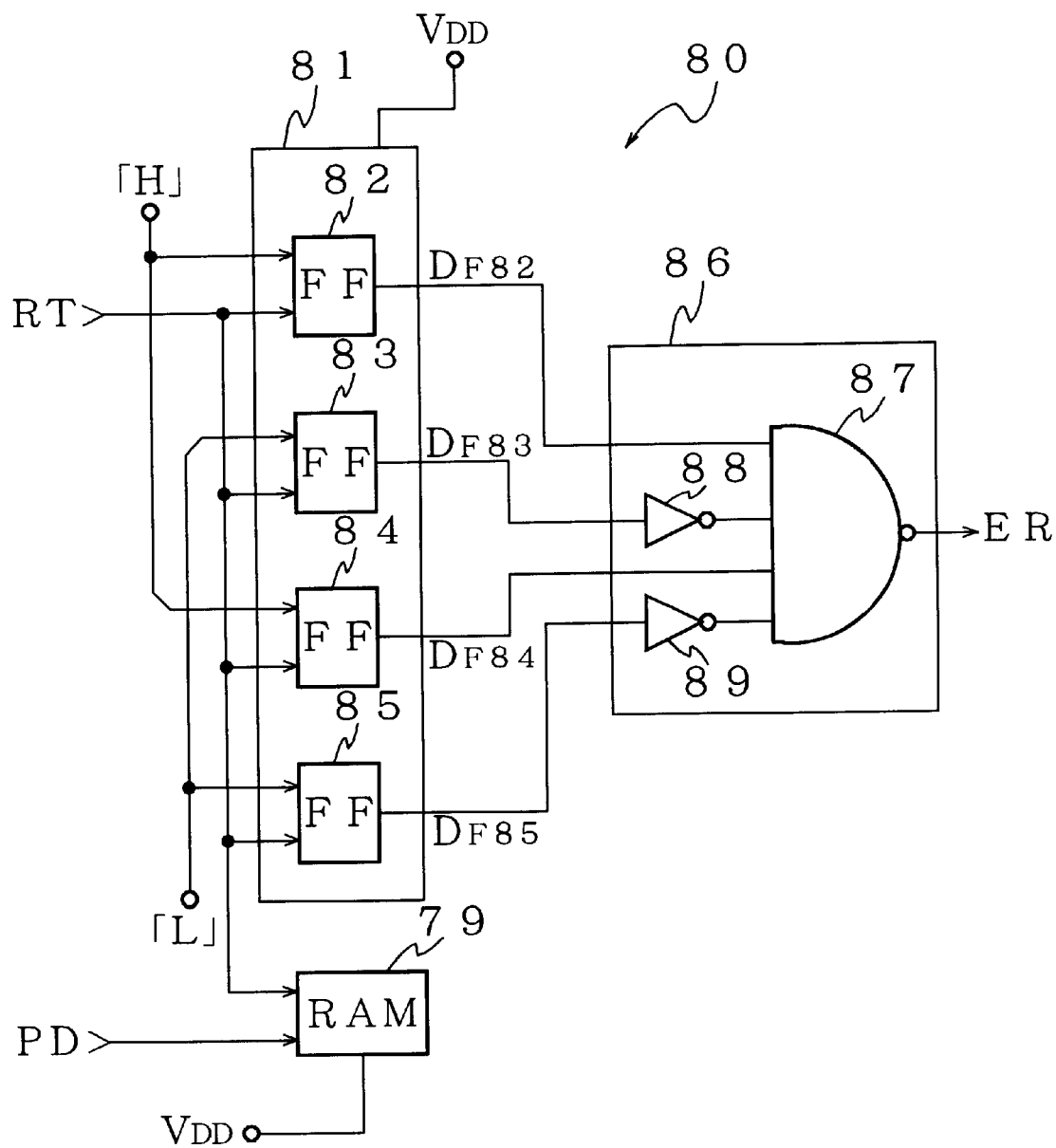
FIG. 2 is block diagram of a parameter loss detection circuit according to an embodiment of the present invention.

FIG. 2 illustrates a preferred embodiment of a parameter loss detection circuit 80. As shown, parameter loss detection circuit 80 includes a data holding circuit 81, a flag setting circuit 86, and a memory 79. Data holding circuit 81 preferably includes flip-flops 82, 83, 84, and 85, each a conventional flip-flop device. Alternatively, data holding circuit 81 may be comprised of other data holding devices, such as a semiconductor memory, a latch circuit, or the like.

Flag setting circuit 86 preferably includes inverters 88 and 89 and NAND gate 87, also conventional devices. Memory 79 is a memory device such as a semiconductor random-access memory or the like. As shown, each of data holding circuit 81 and memory 79 receive power from power supply signal VDD. In an embodiment of the present invention, data holding circuit 81 and memory 79 are comprised of similar components to assure that a power fluctuation which causes a loss of data in memory 79 also causes a loss of data in data holding circuit 81.

As shown, the input terminal of each of flip-flops 82 and 84 is driven by a constant logic high (H) signal and the input terminal of each of flip-flops 83 and 85 is driven by a constant logic low (L) signal. Reset signal RT is applied to each of flip-flops 82, 83, 84, and 85.

In a preferred operation, upon the rise of reset signal RT, flip-flop 82 outputs a logic H as output signal DF82, flip-flop 83 outputs a logic L as output signal DF83, flip-flop 84 outputs a logic H as output signal DF84, and flip-flop 85 outputs a logic L as output signal DF85. Output signals DF82 and DF84 are supplied to inputs of NAND gate 87. Output signals DF83 and DF85 are supplied to inverters 88 and 89, respectively, for inversion. Inverted signals corresponding to signals DF83 and DF85, respectively, are supplied to inputs of NAND gate 87. The output of NAND gate 87 is a loss flag signal ER.

Memory 79 is coupled to microcontroller 76 and receives parameter data PD therefrom. Memory 79 stores parameter data PD. Memory 79 also receives reset signal RT which resets memory 79 for storage of new, additional, or replacement parameter data PD. Reset signal RT is preferably generated by microcontroller 76.

Upon the occurrence of a loss of power or an interruption in power, the output states of data holding circuit 81 will preferably change. The change in output state reflects a loss of the data held in data holding circuit 81. A fluctuation in power supply signal VDD may affect data holding circuit 81 by interrupting the power supplied to semiconductor devices or other electronic devices comprising data holding circuit 81. Such a fluctuation may include noise in the power supply signal. Alternatively, a fluctuation in power supply signal VDD may cause a fluctuation in the constant logic high (H) signal and/or the constant logic low (L) signal.

Any change in the output states of data holding circuit 81 will be detected by flag setting circuit 86. Accordingly, flag setting circuit 86 will output loss flag signal ER to indicate that a loss of power has or may have occurred.

For example, when data holding circuit 81 comprises flip-flops 82, 83, 84, and 85, a loss of or interruption in power to the flip-flops should cause each flip-flop to assume an indeterminate state. That is, each of flip-flops 82, 83, 84 and 85 should assume either a logic L or a logic H state. Preferably, the probability that a particular flip-flop will assume a particular logic state is substantially 1:2 or 50%. Accordingly, the probability that any one flip-flop would change state due to a power fluctuation would be 1:2 or 500%. With the shown arrangement of four flip-flops, the probability that a power fluctuation will be detected would be 15:16 or 93.75%. In accordance with the foregoing teachings, additional flip-flops can be added in parallel within data holding circuit 81 to thereby improve the detection accuracy 6f parameter loss detection circuit 80 and a corresponding increase in the input capacity of flag setting circuit 86 can be made.

In an alternative embodiment, flag setting circuit 86 comprises a comparator circuit. Preferably, such a comparator circuit compares fixed input signals, e.g. constant logic H signals and/or constant logic L signals, with signals DF82, DF83, DF84, and DF85. Alternatively, prestored signals may be compared with signals DF82, DF83, DF84, and DF85. Upon any alteration in the comparison result, a loss flag signal ER is output indicating a loss of parameter data.

Pre-processing circuit 20, processing circuit 30, and rate converter 60 are preferably implemented in one or more integrated circuits. To enhance the operational capabilities and effectiveness of parameter loss detection circuit 80, a preferred design plan for integrated circuits incorporating parameter loss detection circuit 80 has been developed. As an example, FIG. 3(a) illustrates a preferred implementation of processing circuit 30 in an integrated circuit 901.

Figure 3A:
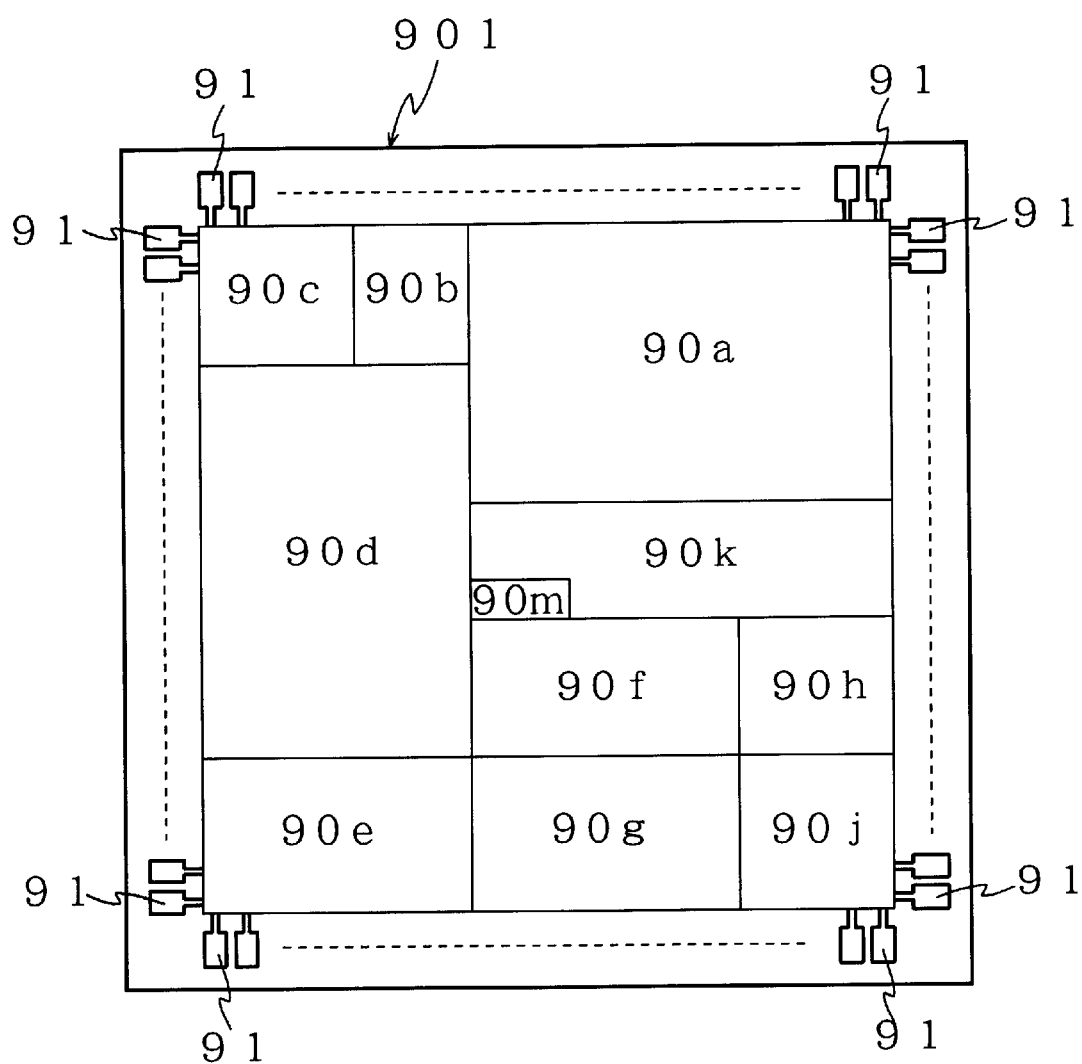
FIGS. 3(a) and 3(b) are schematic diagrams of an integrated circuit.
Figure 3:
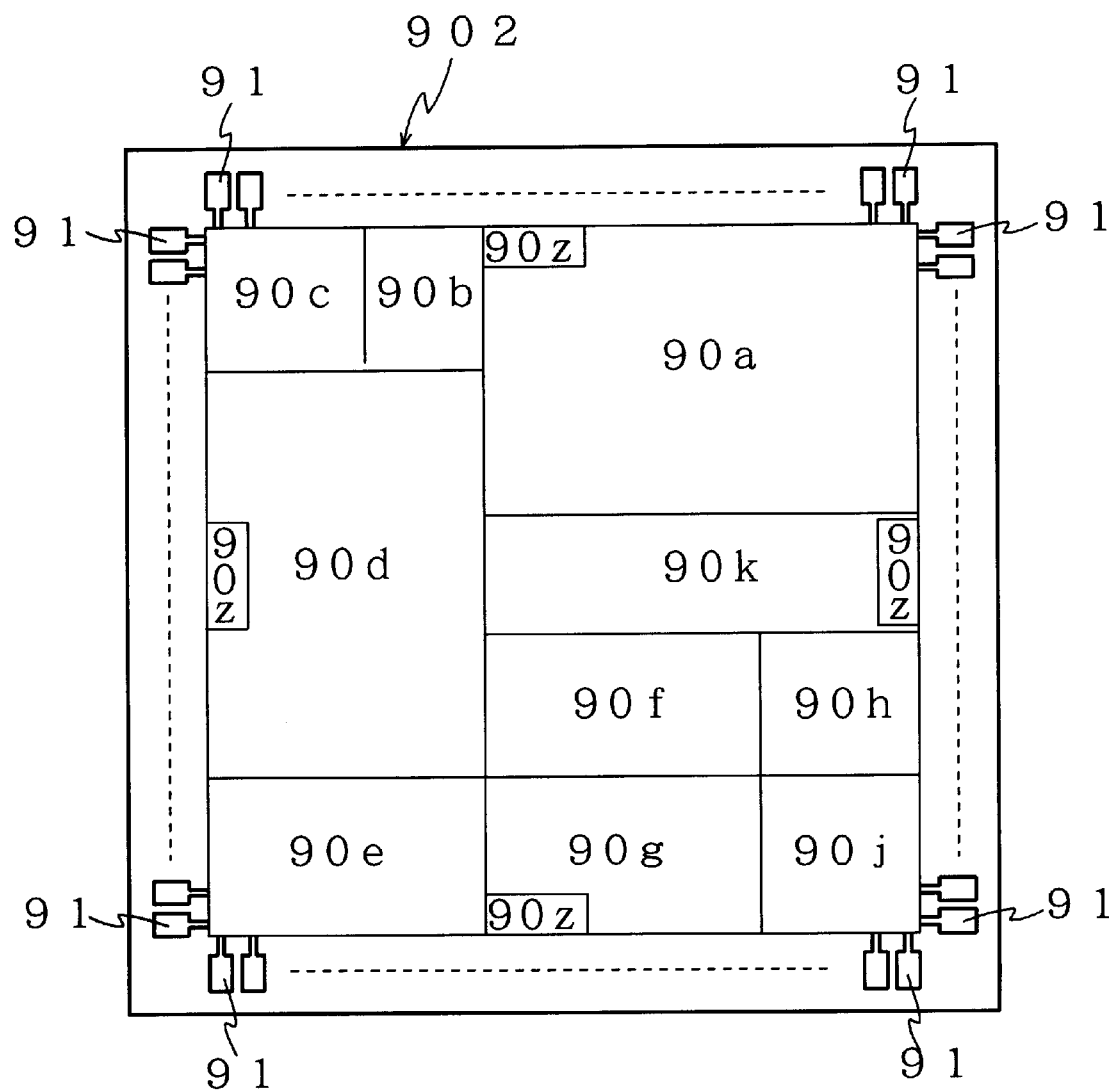

Preferably, integrated circuit 901 comprises a number of circuit blocks which may roughly delineated as shown in FIG. 3(a). Circuit 901 includes an image enhancer block 90a, an up-converter block 90b, a determining block 90c, a processing block 90d, a correction processing block 90e, a knee block 90f, a YC matrix block, brightness data output block 90h, color difference data output block 90j, control block 90k, and parameter loss detection block 90m. Up-converter block 90b up-converts a sampling frequency. Determining block 90c monitors data transfer operations.

Also shown are bonding pads 91 which are connected to many of the circuit blocks of integrated circuit 901. Bonding pads 91 provide connection points for terminals (not shown) exposed outside the packaging (not shown) for circuit 901. Electrical power and electrical communication signals are supplied to circuit 901 through such terminals via bonding pads 91.

Utilizing digital color signals DBR, DBAR, DBBR, DBG, DBAG, DBBG, and DBB, image enhancer block 90a generates an aperture signal for aperture correction and a detail signal for contour correction. Correction processing block 90e performs aperture correction, contour correction and gamma correction utilizing the aperture signal and the detail signal. Processing block 90d performs linear matrix processing utilizing digital color signals DBR, DBG, and DBB. Knee block 90f performs knee correction processing.

As a function of corrected signals produced by correction processing block 90e, processing block 90d, and knee block 90f, YC matrix block 90g generates brightness data Y and color difference data Cr and Cb. Brightness data output block 90h supplies brightness data Y for output and color difference data output block 90j supplies color difference data Cr and Cb for output. Control block 90k, communicates with microcontroller 76 and generates clock signals for controlling and synchronizing the operations of the other circuit blocks of integrated circuit 901.

Parameter loss detection block 90m comprises parameter loss detection circuit 80. If electrical power is provided to circuit 901 at all four edges of the circuit, parameter loss detection block 90m is preferably located at the center of integrated circuit 901. In such a configuration, it is likely the central region of circuit 901 will be the farthest region from a bonding pad 91 to which electrical power is applied. Consequently, due to the resistance of conductors which connect bonding pads 91 to the central region of circuit 901, the electrical power available at such region will be less than or at least not greater than that normally available to other portions of circuit 901.

Alternatively, if electrical power is provided to circuit 901 at less than all four edges, parameter loss detection block 90m may be positioned within circuit 901 at the distance farthest from a bonding pad 91 to which electrical power is applied. For example, if electrical power is provided to circuit 901 at one edge, parameter loss detection block 90m may be positioned at the opposite edge of circuit 901. As a further alternative, if, due to unequal power consumption by blocks of circuit 901, some other region in circuit 901 is likely to have the least amount of power available, parameter loss detection block 90m may be located in that region.

In another alternative embodiment, integrated circuit 902 illustrated in FIG. 3(b) includes parameter loss detection circuit 80 which is not concentrated in a single parameter loss detection block 90m. Instead, the components of parameter loss detection circuit 80 are divided among several different parameter loss detection blocks 90z in integrated circuit 902. Otherwise, integrated circuit 902 is composed as previously described in connection with integrated circuit 901.

Preferably, parameter loss detection blocks 90z are evenly distributed in integrated circuit 902, as shown in FIG. 3(b). Preferably, pairs of flip-flops from data holding circuit 81, e.g. one driven with a logic H signal and one driven with a logic L signal, are distributed throughout integrated circuit 902 to afford more accurate power fluctuation detection. If data holding components from data holding circuit 81 are provided near bonding pads 91, a loss of parameter data caused by noise may also be detected.

Parameter loss detection circuit 80, situated within parameter loss detection block 90m and parameter loss detection blocks 90z, includes memory 79, as aforedescribed. Memory 79 stores parameter data PD supplied by microcontroller 76. One or more of the circuit blocks of integrated circuits 901 and 902 may access parameter data PD stored in memory 79. Each such circuit block may then configure and control its processing operations as a function of parameter data PD.

Figure 4:
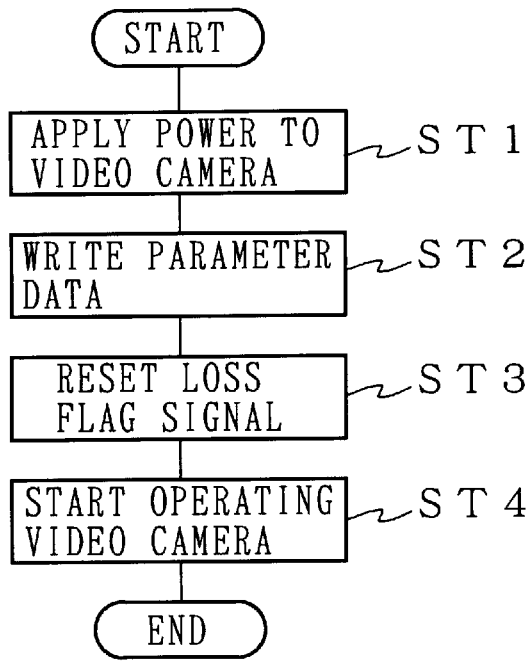
FIG. 4 is a flow chart to which reference will be made in describing the operation of the apparatus of FIG. 1.

FIG. 4 illustrates a flow chart of the processing executed by imaging device 100. In step ST1, power is applied to imaging device 100 and processing proceeds with step ST2. In step ST2, microcontroller 76 supplies parameter data PD to pre-processing circuit 20, processing circuit 30, and rate converter 60. In the following step ST3, the reset signal RT is strobed to reset loss flag signal ER. Processing proceeds with step ST4 in which operation of imaging device 100 commences. In particular, imaging device 100 executes a self-diagnostic processing operation.

Figure 5:
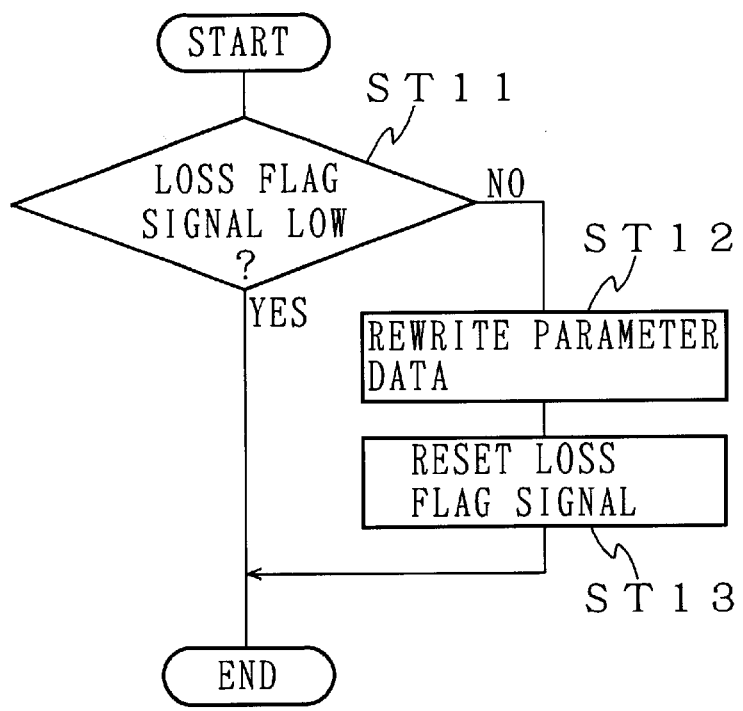
FIG. 5 is a flow chart to which reference will be made in describing the operation of the apparatus of FIG. 1.

A preferred implementation of the self-diagnostic processing operation of step ST4 is illustrated in the flow chart of FIG. 5. In step ST11, microcontroller 76 detects the state of loss flag signal ER supplied by one or more of pre-processing circuit 20, processing circuit 30, and rate converter 60. Preferably, the self-diagnostic operation is successively performed with respect to each of pre-processing circuit 20, processing circuit 30, and rate converter 60.

If loss flag signal ER indicates that no loss of power has occurred, for example with a logic L signal, then the self-diagnostic processing operation for the particular circuit ends and a self-diagnostic processing operation for another circuit is commenced in step ST11. If loss flag signal ER indicates that a loss of power has or may have occurred, for example with a logic H signal, then processing proceeds with step ST12.

In step ST12, microcontroller 76 supplies replacement or new parameter data PD to the circuit which indicated that a loss of power had or may have had occurred. Alternatively, microcontroller 76 supplies replacement or new parameter data PD to every circuit which incorporates parameter loss detection circuit 80 or to a predetermined set of circuits of imaging device 100. Processing proceeds with step ST13.

In step ST13, the reset signal RT is strobed to reset loss flag signal ER. Preferably, the self-diagnostic processing operation for the particular circuit ends and a self-diagnostic processing operation for another circuit is commenced in step ST11. It is preferred that a self-diagnostic operation be performed with respect to pre-processing circuit 20, processing circuit 30, and rate converter 60 once each second.

A preferred implementation of the reset function of steps ST3 and ST13 is illustrated in FIGS. 6A, 6B, 6C, 6D, 6E, 6F and 6G. Also illustrated is a sample power failure processing by parameter loss detection circuit 80. FIG. 6A illustrates a power supply signal VDD varying over time. FIG. 6B illustrates a reset signal RT varying over time. FIGS. 6C, 6D, 6E, and 6F illustrate output signals DF82, DF83, DF84, and DF85, respectively, varying over time. FIG. 6G illustrates loss flag signal ER varying over time.

In a reset function according to step ST3, at a time t1, reset signal RT is strobed. This strobe is shown as a logic H pulse signal. The pulse signal of reset signal RT causes memory 79 to store the parameter data PD supplied by microcontroller 76. Additionally, the pulse signal of reset signal RT, input to each of flip-flops 82, 83, 84, and 85, causes each flip-flop to reach a definite output state. As shown, output signals DF82 and DF84 are caused to maintain a logic H signal while output signals DF83 and DF85 are caused to maintain a logic L signal. Accordingly, flag setting circuit 86 outputs loss flag signal ER as a logic L signal corresponding to a reset state.

As shown in FIG. 6A, a momentary loss of power is represented as a spike in power supply signal VDD at a time t2. The spike in power supply signal VDD at time t2 causes, for example, flip-flop 83 to assume an indeterminate state which comprises a change from its previous state. Of course, any of flip-flops 82, 83, 84, and 85 might be affected by the loss of power. In this example, at time t2, output signal DF83 changes from a logic L signal to a logic H signal. Flag setting circuit 86 detects the change in output signal DF83 and causes loss flag signal ER to change state, indicating that a loss of power may have occurred. As shown in FIG. 6G, at time t2, logic flag signal ER changes from a logic L state to a logic H state.

It should be appreciated that a more substantial loss of power will also be detected by data holding circuit 81 in the manner described above.

In a reset function according to step ST13, at a time t3, reset signal RT is strobed. This strobe is shown as a logic H pulse signal. The pulse of reset signal RT causes memory 79 to store the parameter data PD supplied by microcontroller 76. Additionally, the pulse of reset signal RT, input to each of flip-flops 82, 83, 84, and 85, causes each flip-flop to reach a definite output state. As shown, output signals DF82 and DF84 are caused to maintain a logic H signal while output signals DF83 and DF85 are caused to maintain a logic L signal. Accordingly, flag setting circuit 86 outputs loss flag signal ER as a logic L signal corresponding to a reset state.

As will be appreciated by one of ordinary skill, parameter loss detection circuit 80 may be incorporated into any of a number of components of an imaging device besides the implementation in pre-processing circuit 20, processing circuit 30, and rate converter 60 described hereinabove. Parameter loss detection circuit 80 has the advantage of detecting in hardware a power fluctuation or loss and providing with hardware an indication that a power fluctuation or loss has occurred, corresponding to loss or corruption of parameter data. Relatively little software processing is needed by microcontroller 76 to poll and reset loss flag signal ER. Advantageously, the parameter data itself need not be polled by microcontroller 76, or otherwise, to determine if parameter data has been corrupted or lost.

Further, since parameter loss detection circuit 80 constantly monitors power supply signal VDD, it is less likely that a power fluctuation will not be detected. Parameter data correction is executed during normal operation of imaging device 100, allowing substantially uninterrupted operation during image acquisition and minimizing any processing errors which may be caused by power supply signal fluctuations. Moreover, increased power fluctuation detection accuracy is achieved simply by increasing the data storage capacity of data holding circuit 81 and scaling the flag setting circuit 86 accordingly.

Additionally, although described hereinabove in connection with an imaging device, the present parameter loss detection circuit 80 may be incorporated into many other types of signal processing circuits to detect the loss or corruption of locally stored data. Such signal processing circuits may include, for example, video tape recorders, computers, video cameras, and the like. The present invention is particularly useful in portable devices which may suffer power fluctuations due to irregularities in the power supply signal supplied by a portable power supply unit.

Although illustrative embodiments of the present invention and modifications thereof have been described in detail herein, it is to be understood that this invention is not limited to these precise embodiments and modifications, and that other modifications and variations may be effected therein by one skilled in the art without departing from the scope and spirit of the invention as defined by the appended claims.

What is claimed is:

1. A digital power fluctuation detecting apparatus for detecting fluctuations in a power supply signal, said apparatus comprising:
    data storage means, coupled to receive said power supply signal, for receiving and storing a plurality of predetermined digital data signals as a plurality of stored signals, each of said stored signals being associated with said power supply signal, and for modifying at least one of said plurality of stored signals if said received power supply signal fluctuates; and
    power fluctuation detecting means comprising a single unit, coupled to said data storage means, for monitoring said plurality of stored signals together and detecting a fluctuation in the power supply signal received by the data storage means by determining if said plurality of stored signals differ from said plurality of predetermined digital data signals.

2. Apparatus according to claim 1, further comprising reset means, coupled to said data storage means, for resetting said plurality of stored signals by re-storing said plurality of predetermined digital data signals as said plurality of stored signals.

3. Apparatus according to claim 2, wherein said reset means is responsive to a reset signal.

4. Apparatus according to claim 2, wherein:
    said power fluctuation detecting means is operative to provide a loss flag signal when it determines that a power fluctuation has occurred; and
    said apparatus further comprising controller means for generating a reset signal and for supplying said reset signal to said reset means, said controller operative to receive said loss flag signal and to supply said reset signal to said reset means when said loss flat signal is received to thereby reset said plurality of stored signals each time a power fluctuation occurs.

5. Apparatus according to claim 1, wherein said power supply signal fluctuates if a noise is introduced into said power supply signal.

6. Apparatus according to claim 1, wherein said plurality of predetermined digital data signals comprise fixed digital signals that fluctuate if said power supply signal fluctuates.

7. Apparatus according to claim 1, wherein said plurality of predetermined digital data signals comprise fixed digital signals that fluctuate if a noise is introduced into said power supply signal.

8. Apparatus according to claim 1, wherein said data storage means comprises a plurality of memory devices.

9. Apparatus according to claim 8, wherein said plurality of memory devices comprise a plurality of flip-flop devices.

10. Apparatus according to claim 1, wherein said data monitoring means continuously monitors said plurality of stored signals.

11. Apparatus according to claim 1, wherein each of said plurality of stored signals has an initial logic state, and said power fluctuation detection means performs a predetermined action if it determines that only one stored signal differs from its initial logic state, and performs the same predetermined action if it determines that a plurality of said stored signals differ from their respective initial logic states.

12. Apparatus according to claim 1, wherein said single unit is a logic unit.

13. Apparatus according to claim 12, wherein said logic unit is a processor.

14. A digital power fluctuation detecting apparatus for detecting fluctuations in a power supply signal, said apparatus comprising:
    data storage means, coupled to receive said power supply signal, for receiving and storing a plurality of predetermined digital data signals as a plurality of stored signals, each of said stored signals being associated with said power supply signal, and for modifying at least one of said plurality of stored signals if said received power supply signal fluctuates; and
    power fluctuation detecting means, coupled to said data storage means, for monitoring said plurality of stored signals and determining if said plurality of stored signals differ from said plurality of predetermined digital data signals due to the fluctuation in the power supply signal received by the data storage means, said power fluctuation detecting means including a comparing device comprising a single logic gate providing a single output logic signal, and having a plurality of input terminals for receiving a respective plurality of input signals, each input signal corresponding to one of said plurality of stored signals, said input signals each being in a predetermined logic state when there is no fluctuation of said power supply signal, and, if any one of the input signals changes logic state, the output logic signal of the logic gate changes state to thereby indicate that a power fluctuation has occurred.

15. Apparatus according to claim 14, wherein said single logic gate is a NAND gate.

16. A parameter loss detection apparatus for detecting contamination of a plurality of parameter data by a fluctuation in a power supply signal, said apparatus comprising:

data storage means, coupled to receive said power supply signal, for receiving and storing a plurality of predetermined digital data signals as a plurality of stored signals, each of said stored signals being associated with said power supply signal, and for modifying at least one of said plurality of stored signals if said received power supply signal fluctuates;

parameter data storage means, coupled to receive said power supply signal, for storing a plurality of parameter data supplied by a controller;

power fluctuation detecting means comprising a single unit, coupled to said data storage means, for monitoring said plurality of stored signals together and detecting a fluctuation in the power supply signal received by the data storage means by determining if said plurality of stored signals differ from said plurality of predetermined digital data signals and for generating a parameter data loss signal if said plurality of stored signals differ from said plurality of predetermined digital data signals.

17. Apparatus according to claim 16, wherein said data storage means and said parameter storage means have a similar construction.

18. Apparatus according to claim 16, wherein said power supply signal fluctuates if a noise is introduced into said power supply signal.

19. Apparatus according to claim 16, wherein said plurality of predetermined digital data signals comprise fixed digital signals that fluctuate if said power supply signal fluctuates.

20. Apparatus according to claim 16, wherein said plurality of predetermined digital data signals comprise fixed digital signals that fluctuate if a noise is introduced into said power supply signal.

21. Apparatus according to claim 16, wherein said data storage means comprises a plurality of memory devices.

22. Apparatus according to claim 21, wherein said plurality of memory devices comprise a plurality of flip-flop devices.

23. Apparatus according to claim 16, wherein said data monitoring means continuously monitors said plurality of stored signals.

24. Apparatus according to claim 16, further comprising reset means, coupled to said data storage means and to said parameter data storage means, for resetting said plurality of stored signals by re-storing said plurality of predetermined digital data signals as said plurality of stored signals and for resetting said plurality of parameter data by storing another plurality of parameter data supplied by said controller in said parameter data storage means.

25. Apparatus according to claim 24, wherein said reset means is responsive to a reset signal.

26. Apparatus according to claim 25, wherein:

said controller generates said reset signal;

said power fluctuation detecting means is operative to provide a loss flag signal to said controller when it determines that a power fluctuation has occurred; and said controller is operative to receive said loss flag signal and to supply said reset signal to said reset means when said loss flag signal is received to thereby reset said plurality of stored signals when a power fluctuation occurs.

27. Apparatus according to claim 25, wherein:

said power fluctuation detecting means is operative to provide a loss flag signal to said controller when it determines that a power fluctuation has occurred; and, said controller is operable to re-store said parameter data in said parameter data storage means when the received loss flag signal indicates that a power fluctuation has occurred.

28. Apparatus according to claim 16, wherein said apparatus is centrally located on an integrated circuit.

29. Apparatus according to claim 16, wherein said apparatus is distributed among a plurality of locations on an integrated circuit.

30. A parameter loss detection apparatus for detecting contamination of a plurality of parameter data by a fluctuation in a power supply signal, said apparatus comprising:

data storage means, coupled to receive said power supply signal, for receiving and storing a plurality of predetermined digital data signals as a plurality of stored signals, each of said stored signals being associated with said power supply signal, and for modifying at least one of said plurality of stored signals if said received power supply signal fluctuates;

parameter data storage means, coupled to receive said power supply signal, for storing a plurality of parameter data supplied by a controller;

power fluctuation detecting means, coupled to said data storage means, for monitoring said plurality of stored signals and determining if said plurality of stored signals differ from said plurality of predetermined digital data signals due to the fluctuation in the power supply signal received by the data storage means and for generating a parameter data loss signal if said plurality of stored signals differ from said plurality of predetermined digital data signals, wherein said power fluctuation detecting means includes a comparing device that comprises a single logic gate providing a single output logic signal, and having a plurality of input terminals for receiving a respective plurality of input signals, each input signal corresponding to one of said plurality of stored signals, said input signals each being in a predetermined logic state when there is no fluctuation of said power supply signal, and, if any one of the input signals changes logic state, the output logic signal of the logic gate changes state to thereby indicate that a power fluctuation has occurred.

31. A digital power fluctuation detecting apparatus for detecting fluctuations in a power supply signal, said apparatus comprising:

a data storage part, coupled to receive said power supply signal, for receiving and storing a plurality of predetermined digital data signals as a plurality of stored signals, each of said stored signals being associated with said power supply signal, and for modifying at least one of said plurality of stored signals if said received power supply signal fluctuates; and a power fluctuation detecting part comprising a single unit, coupled to said data storage means, for monitoring said plurality of stored signals together and detecting a fluctuation in the power supply signal received by the data storage part by determining if any one or more of said plurality of stored signals differs from an initial logic state thereof.

32. Apparatus according to claim 31, wherein said power fluctuation detection means performs a predetermined action if it determines that only one stored signal differs from its initial logic state, and performs the same predetermined action if it determines that a plurality of said stored signals differ from their respective initial logic states.

33. Apparatus according to claim 31, wherein said single unit is a logic unit.

34. Apparatus according to claim 33, wherein said logic unit is a processor.

35. Apparatus according to claim 31, wherein said single unit is a comparing device comprising a single logic gate providing a single output logic signal, and having a plurality of input terminals for receiving a respective plurality of input signals, each input signal corresponding to one of said plurality of stored signals, said input signals each being in a predetermined logic state when there is no fluctuation of said power supply signal, and, if any one of the input signals changes logic state, the output logic signal of the logic gate changes state to thereby indicate that a power fluctuation has occurred.

* * * * *